United States Patent [19]

Aoshima

[11] Patent Number: 5,740,517
[45] Date of Patent: Apr. 14, 1998

[54] RADIO PAGER SYNC ACQUISITION TIMING ARRANGEMENT FOR BATTERY SAVING OPERATION

[75] Inventor: Takashi Aoshima, Tokyo, Japan

[73] Assignee: NEC Corporation, Tokyo, Japan

[21] Appl. No.: 562,376

[22] Filed: Nov. 24, 1995

[30] Foreign Application Priority Data

Nov. 24, 1994 [JP] Japan ................................. 6-314011

[51] Int. Cl.$^6$ ..................................................... H04B 7/08
[52] U.S. Cl. .................. 455/38.3; 455/343; 340/825.44; 370/311
[58] Field of Search ................................. 455/32.1, 38.1, 455/38.3, 38.4, 127, 228, 229, 230, 231, 343; 370/311, 347, 349, 350, 510, 514; 340/825.44, 825.47

[56] References Cited

U.S. PATENT DOCUMENTS

| | | | |
|---|---|---|---|
| 4,086,537 | 4/1978 | Asakawa et al. | 325/478 |
| 4,961,073 | 10/1990 | Drapac et al. | 455/38.3 |
| 5,376,975 | 12/1994 | Romero et al. | 455/38.3 |
| 5,382,949 | 1/1995 | Mock et al. | 455/343 |
| 5,530,911 | 6/1996 | Lerner et al. | 455/343 |

FOREIGN PATENT DOCUMENTS

| | | |
|---|---|---|
| 0 597 308 | 5/1994 | European Pat. Off. . |
| WO 91/06188 | 5/1991 | WIPO . |
| WO 91/06189 | 5/1991 | WIPO . |

*Primary Examiner*—Reinhard J. Eisenzopf
*Assistant Examiner*—Thanh Le
*Attorney, Agent, or Firm*—Sughrue, Mion, Zinn, Macpeak & Seas, PLLC

[57] ABSTRACT

In a selective calling radio pager for receiving a paging signal of a superframe structure comprising a recurrent series of frames, each containing a series of burst signals containing a synchronization field, a short warm-up period and a short time-out period are established before each burst signal of an assigned frame of a first superframe is received. A long warm-up period and a long time-out period are established before the burst signals of the assigned frame of a second superframe as received. The receiver is activated at the start of the short warm-up period advanced from the start of each burst signal and a determination is made whether synchronization is established within the subsequent short time-out period. A long warm-up period and a long time-out period are then established and the receiver is deactivated. The receiver is reactivated at the start of the long warm-up period advanced from the start of the assigned frame of a second superframe, and determination is made whether synchronization is established within the long time-out period.

17 Claims, 4 Drawing Sheets

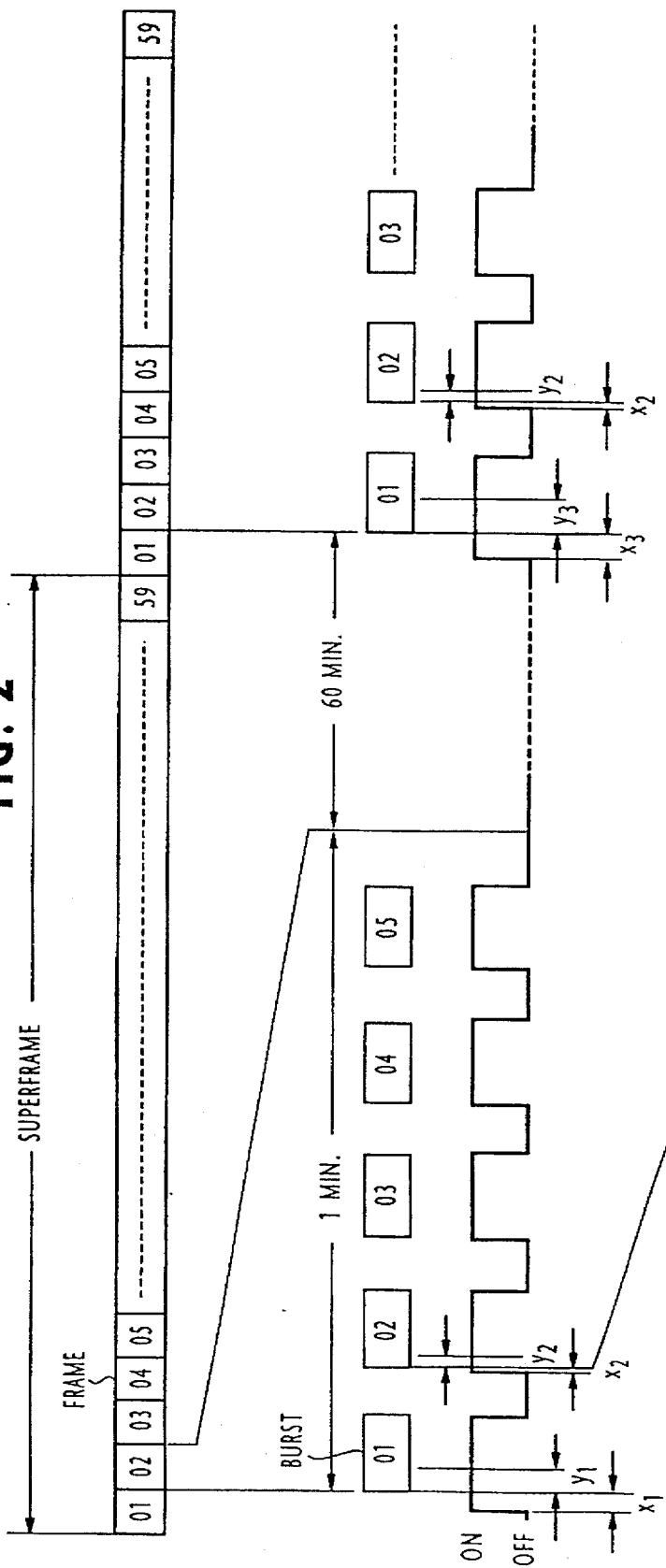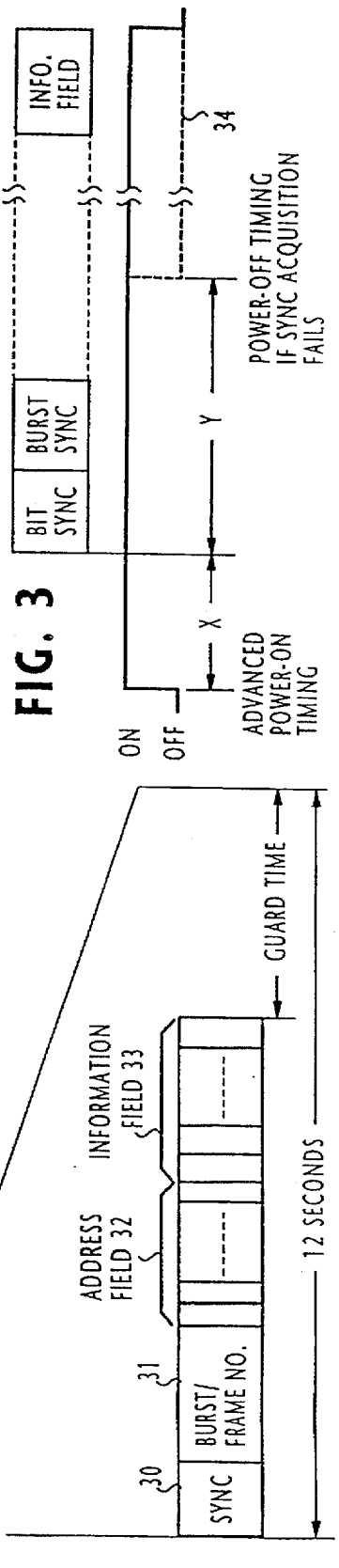

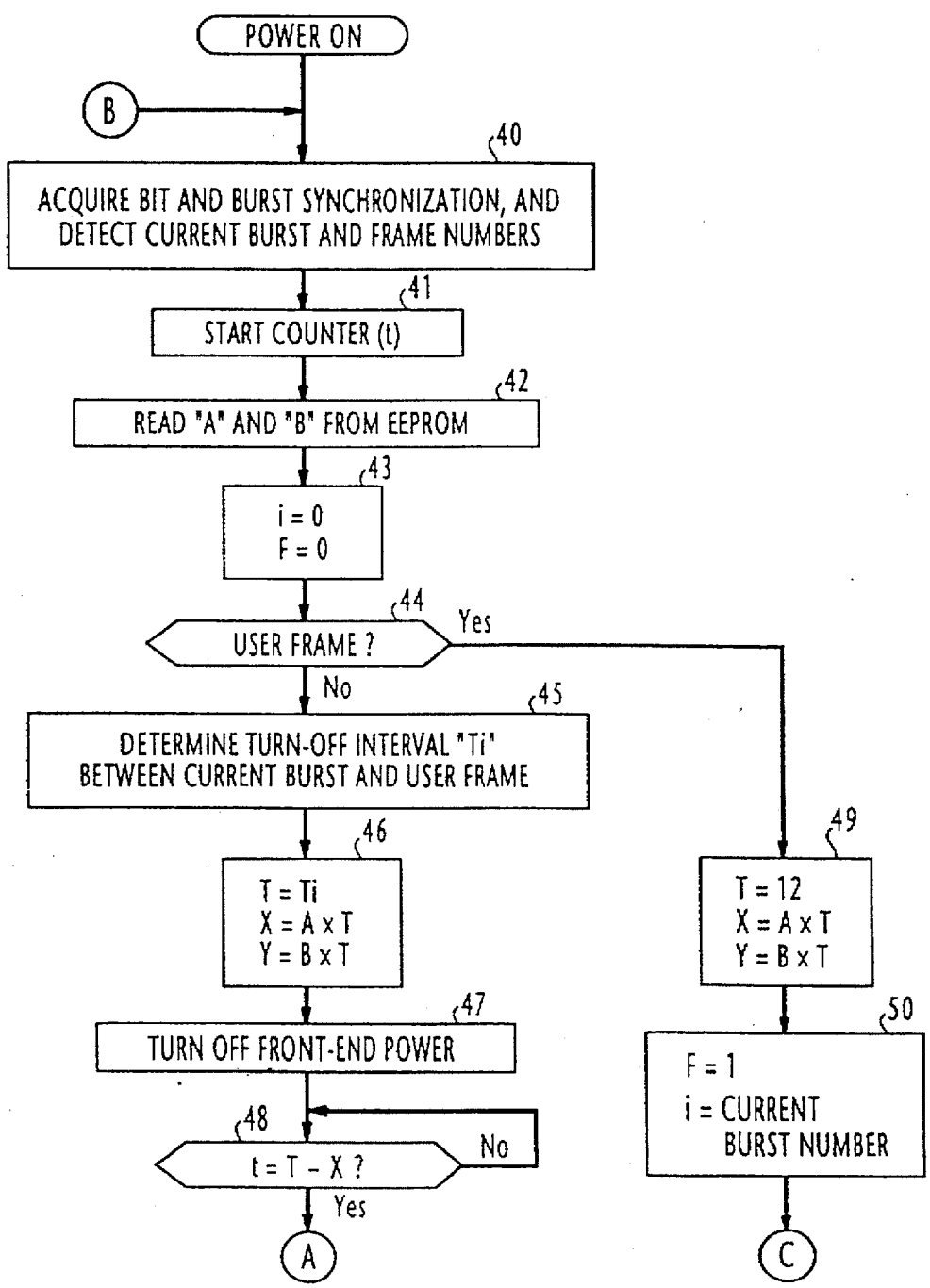

RADIO PAGER SYNC ACQUISITION TIMING ARRANGEMENT FOR BATTERY SAVING OPERATION

BACKGROUND OF THE INVENTION

Field of the Invention

The present invention relates generally to radio pager power saving techniques and more particularly to the improvement of the power saving performance of radio pagers wherein the power supply to their receiver, or front end is interrupted at short intervals during reception of a user (assigned) frame and at long intervals each time the user frame has been received.

Description of the Related Art

In a radio paging system such ERMES (European Radio Message System), paging signals are transmitted in a superframe format in which same frames are transmitted in a recurrent series. Each paging user is assigned one of the frames. The frame contains a series of burst signals each having a sync field, a burst/frame number, an address field and an information field. The address field carries a plurality of user address numbers and the information field carries a corresponding number of messages. During the reception of the burst signals of a frame assigned to a particular pager, the pager's front end is repeatedly activated at intervals (typically 12 seconds) corresponding to the burst signals and deactivated for a long period (typically 60 minutes) when the assigned frame has been received. In order to allow the pager's synchronizer to resynchronize to a burst signal in the next user frame after the relatively long period of deactivation of its front end, the front end is activated at timing advanced from the start of the first burst signal of the next user frame so that it is warmed up sufficiently before the start of the first burst signal and the pager is then given a sufficient time-out period for resynchronization. The same values of these warm-up and time-out periods are used for repeatedly activating the pager during the reception of the user-frame burst signals.

Since the same warm-up and time-out periods are used for power-saving the pager during the reception of successive burst signals as in the case of the post-long-inactive period, the front end is activated too early and the time-out period of the synchronizer is too long. Therefore, the power saving performance of the prior art pager is not satisfactory.

SUMMARY OF THE INVENTION

It is therefore an object of the present invention to improve the power saving performance of a radio pager by controlling the receiver warm-up period and the synchronizer time-out period according to the length of the preceding inactive period of the receiver.

According to a broader aspect of the present invention, the inventive radio pager comprises a receiver arranged to be activated for receiving a paging signal and a synchronizer for synchronizing to a bit sequence contained in each burst signal of the paging signal. A power saving controller periodically activates the receiver at short intervals during reception of closely spaced burst signals with a short warm-up period for each burst signal to allow the receiver to be warmed up within the short warm-up period and with a short time-out period subsequent to the short warm-up period to allow the synchronizer to synchronize within the short time-out period, and activates the receiver at long intervals during reception of a burst signal remotely spaced from the closely spaced burst signals with a long warm-up period to allow the receiver to be warmed-up within the long warm-up period and with a long time-out period subsequent to the long warm-up period to allow the synchronizer to synchronize within the long time-out period.

In a preferred embodiment, the short warm-up period and the short time-out period are increased when the synchronizer repeatedly fails to establish synchronization. Specifically, the number of burst signals to which synchronization is nor established by the synchronizer is counted and the short warm-up period and the short time-out period are multiplied by a factor corresponding to the counted number of the burst signals.

In a further preferred embodiment, the number of burst signals to which synchronization is not established by the synchronizer is counted and the pager is initialized so that it restarts operation if the counted amber of the burst signals exceeds a predetermined value.

In a narrower aspect of the present invention, there is provided a selective calling radio pager for receiving a paging signal of a superframe structure comprising a recurrent series of frames each containing a plurality of burst signals, each burst signal comprising a synchronization field, a frame number field and an address field, one of the frames in each superframe being assigned to the pager. The pager comprises a receiver arranged to be activated for receiving the paging signal, and a synchronizer connected to the receiver for establishing synchronization to a bit sequence received in the synchronization field. A controller establishes a short warm-up period and a short time-out period before each of the burst signals of the assigned frame of a first superframe is received and a long warm-up period and a long time-out period before the burst signals of the assigned frame of a second superframe are received. The controller determines whether synchronization is established by the synchronizer within each of the first and long time-out periods, activates the receiver at the start of the short warm-up period advanced from the start of each burst signal of the assigned frame of the first superframe, deactivates it at the end of the short time-out period if the synchronization is not established or after the end of the short time-out period if the synchronization is established, and activates the receiver at the start of the long warm-up period advanced from the start of the assigned frame of the second superframe, and deactivates the receiver at the end of the long time-out period when the synchronization is not established or after the end of the long time-out period if synchronization is established.

BRIEF DESCRIPTION OF THE DRAWINGS

The present invention will be described in farther detail with reference to the accompanying drawings, in which:

FIG. 2 shows the structure of the paging signal used in the present invention and the power saving timing operation during successive frames of the signal;

FIG. 3 shows the advanced timing and sync acquisition time-out period in relation to a burst signal; and FIGS. 4 and 5 are flowcharts illustrating the operation of the controller of the pager according to the present invention.

DETAILED DESCRIPTION

Figure 1:
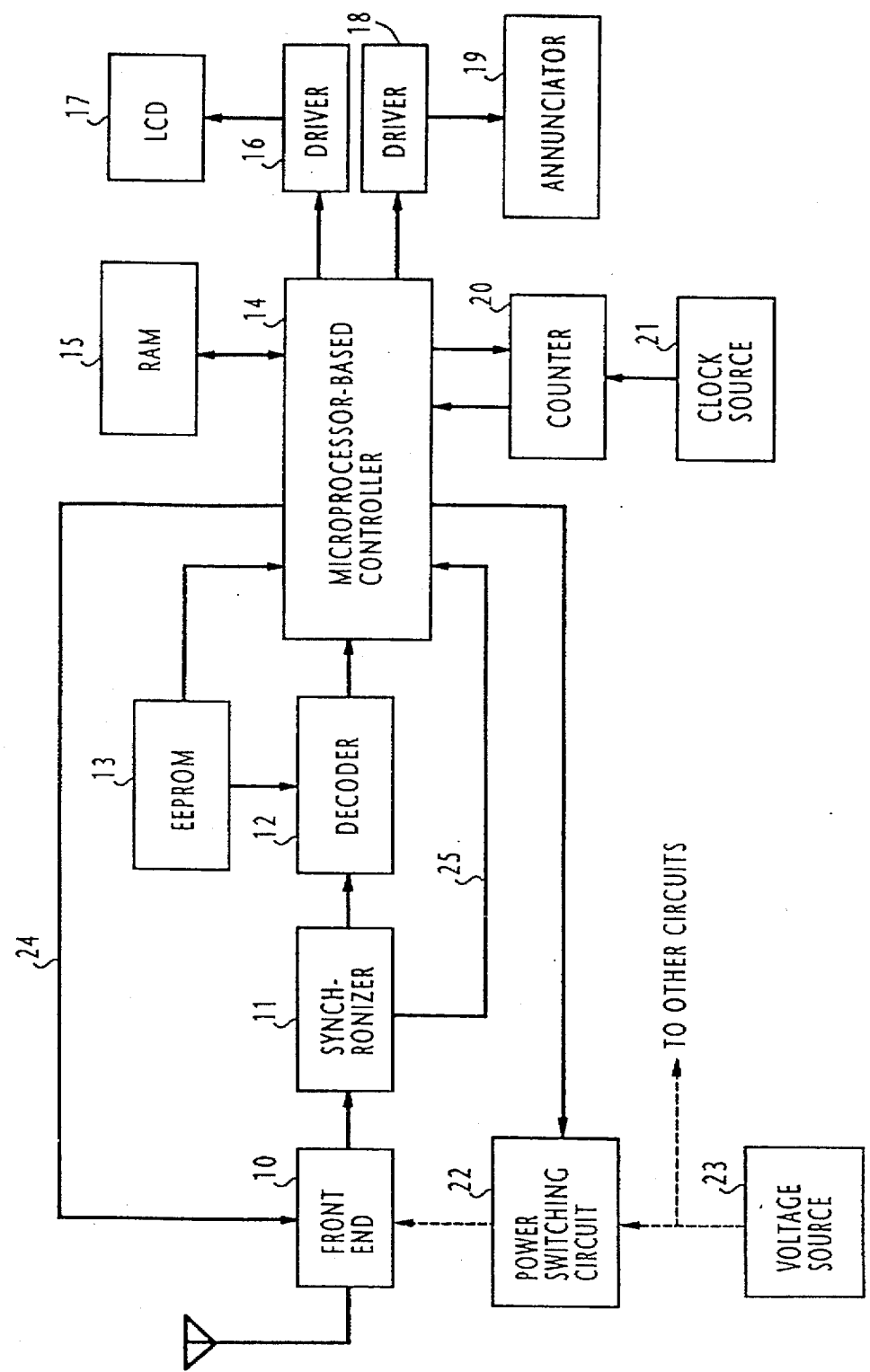
FIG. 1 is a block diagram of a radio display pager embodying the present invention.

In FIG. 1, there is shown a selective calling radio display pager incorporating the sync acquisition timing arrangement of the present invention for power savings purposes. The radio pager includes a power switching circuit 22 for periodically activating a front end 10 with energy supplied from a voltage source 23. When activated, the front end 10 provides frequency conversion of received radio-frequency paging signal to baseband frequency and supplies the baseband signal to a synchronizer 11.

As illustrated in FIG. 2, the paging signal is in a superframe format. According to the ERMES standard, a superframe comprises a series of 60-second frames, numbered "01" through "59". Each frame contains a series of subframes, or burst signals. Typically, five burst signals are transmitted within a frame at 12-second intervals. Paging users are assigned one of the frames and a paging signal destined to a particular user is transmitted by one of the burst signals of the assigned user frame. A plurality of radio frequencies are allocated to the ERMES paging system and one of the frequencies is used for a particular transmission. Provision is therefore made in the system to notify a called user of which frequency to use for reception of a paging signal. If more than one paging signal is transmitted within the period of 60 seconds, more than one frequency is used. In this case, the controller 14 provides frequency control on the front end 10 through line 24. Since the Frequency selection scheme is beyond the scope of the present invention, the description thereof is omitted for simplicity.

Each of the burst signals in a frame contains a sync field 30 having a particular bit sequence to permit acquisition of bit synchronization and burst synchronization. The sync field 30 of each burst signal is followed by a burst/frame number field 31 containing the identification number of the burst signal and the identification number of the frame to which it belongs. An address field 32 contains a series of user address numbers, address field 32 being followed by an information field 33 containing a series of messages correspondingly respectively to the address numbers in the address field 32.

Front end 10 is activated at 12-second intervals corresponding to the burst signals in a user frame when a given superframe is being received and deactivated for an interval of 60 minutes until the same user frame appears during the next superframe. Synchronizer 11 provides acquisition of bit synchronization and burst synchronization each time the front end is energized, using the bit sequence contained in the sync field 30. When the pager is synchronized to the incoming bit stream, the signals contained in the fields 31 to 33 following the sync field are supplied to a conventional decoder 12. Decoder 12 compares the received frame number with a frame number assigned to the user and stored in an EEPROM (electrically erasable programmable read-only memory) 13. If they match, the decoder communicates this fact to a microprocessor-based controller 14 along with the received burst number. Decoder 12 proceeds to compare each of fie address numbers contained in the address field 32 with the user's address stored in the EEPROM. If one of the received address number matches the user's address, the decoder supplies a corresponding message in the information field to the controller 14. Controller 14 stores the message in a random access memory 15 for later retrieval for display on a liquid crystal display unit 17 via a driver 16, and alerts the user by operating an annunciator 19 through driver 18.

A counter 20 is provided for counting high-speed clock pulses from a clock source 21, and the operation of the counter 20 is controlled by the controller 14. As will be described in detail later, the controller 14 controls the power switching circuit 22 so that the front end is given a sufficient time to be powered up for synchronization and given a sufficient time-out period to acquire bit synchronization and burst synchronization.

As shown in FIG. 3, the time period advanced from the beginning of a burst signal is represented as "X" and the time-out period subsequent thereto is represented as "Y". If bit and burst synchronization is not established by the end of the period Y for a given burst, the front end is deactivated as indicated by a dotted line 34. According to the present invention, these timing values X and Y are variable with the amount of time during which fie front end is deactivated, and are represented as follows.

$X = A \times T = \{1/(c-a) - 1/c\} \times c \times T$ $Y = B \times T = \{1/c - 1/(c+b)\} \times c \times T$ where, "a" and "b" are pager's clock rate errors in negative and positive directions, respectively, with respect to the transmitted clock rate "c", and $A = \{1/(c-a) - 1/c\} \times c$ and $B = \{1/c - 1/(c+b)\} \times c$ represent the negative and positive timing errors during the period of a second, and T is the interval at which the front end is activated. Since T is 12 seconds during a user frame and 3600 seconds between successive user frames, the timing values X and Y are variable with battery saving intervals. In FIG. 1, the integers A and B are stored in EEPROM 13

Figure 5:
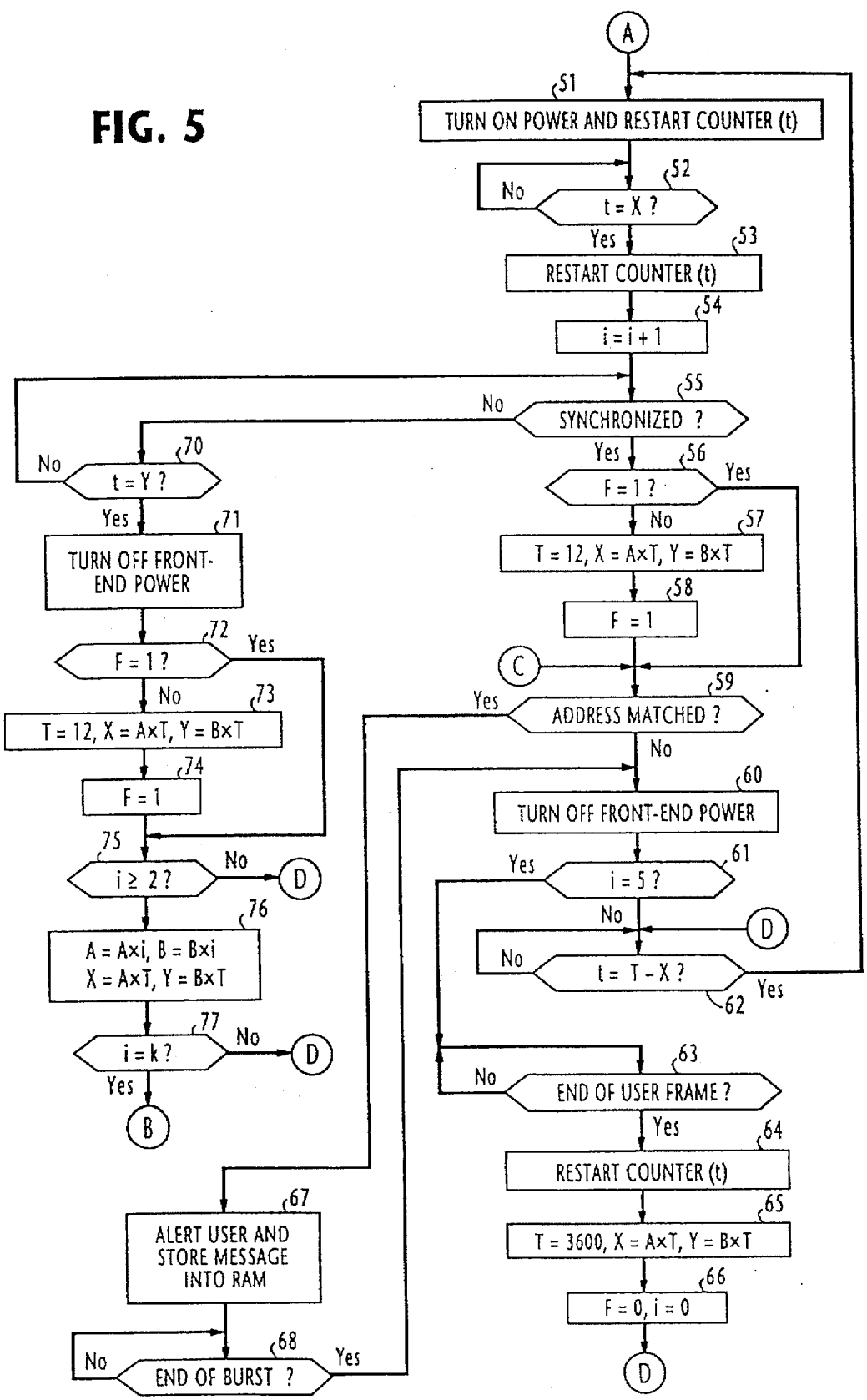

The operation of the controller 14 is illustrated in flow diagram form in FIGS. 4 and 5.

In FIG. 4, it is seen that when the pager's power switch is operated by the user the operation of the controller 14 starts with block 40. Initially, the front end is continuously activated to provide a search for the user frame. This is first done by synchronizer 11 to acquire bit and burst synchronization with a burst signal that occurs in any of the frames at the instant the pager is powered on. Subsequently, decoder 12 provides the controller 14 with a burst number and a frame number contained in the synchronized burst. Flow proceeds to block 41 where the controller 14 commands the counter 20 to start counting the clock. Controller 14 reads integers "A" and "B" from EEPROM 13 (block 42) and initializes a variable "i" and a flag "F" to zero (block 43). A test is made in block 44 to examine the frame number and the controller 14 determines whether the current frame is the user frame or not. If the decision is negative, flow proceeds from block 44 to block 45 where the controller 14 determines the initial turn-off period "Ti" seconds between the current burst signal and the beginning of the user frame. In block 46, a variable T is set equal to Ti seconds and timing variables X and Y are calculated by multiplying integers A and B with the variable T. Controller 14 controls the power switching circuit 22 to turn off the power supply to the front end 10 (block 47). Flow proceeds to block 48 to check the counter 20 to see if the count value "t" is equal to T−X. Since T=Ti and X=A×Ti, the count value t=T−X represents the advance timing that occurs before the beginning of the user frame by an amount proportional to the time interval from the current burst signal to the user frame.

As illustrated in FIG. 2, the front end 10 will be reactivated at the timing advanced by a warm-up interval $x_1$ which is equal to A×Ti in a manner to be described below.

If the decision at block 44 is affirmative, flow proceeds to block 49 to set the variable T equal to 12 seconds and calculate the X and Y timing variables by multiplying the integers A and B with T=12 seconds. In block 50, the flag F is set to 1 and the variable "i" is set equal to the burst number detected in block 40. Flow proceeds from FIG. 4 to FIG. 5.

If the current frame is not the user frame, flow proceeds from block 48 (FIG. 4) to block 51 (FIG. 5) where the controller 14 operates the power switching circuit 22 to reactivate the front end 10 before time $x_1$ advanced from the beginning of the first burst signal of the user frame and restarts the counter 20. Controller 14 then checks to see if the counter 20 indicates that time X has lapsed (block 52). If this is the case, it is determined that the beginning of the first burst signal is detected, and flow proceeds to clear the counter 20 and restarts its count operation (block 53), increments the variable "i" by one (block 54), and determines, in block 55, whether synchronization is established by synchronizer 11 by sensing an output line 25 from the synchronizer. The synchronization test continues until the output of the counter 20 is equal to Y by repeatedly performing executions through blocks 55 and 70. If block 55 is first visited in the execution of the program, the synchronizer 11 is given a sufficient time-out period Y equal to B×Ti. This time-out period is indicated as $y_1$ in FIG. 2.

If synchronization is established within the time-out period $y_1$, flow proceeds from block 55 to block 56 to check to see if F=1. If block 56 is first visited, F is not equal to 1 and flow proceeds from block 56 To block 57 to reset the timing variable T to 12 seconds and calculate the X and Y timing variables by multiplying the integers A and B with T=12 seconds. In block 58, flag F is set equal to 1. If flag F is already set to 1, so that the decision in block 56 is affirmative, or first set to 1 in block 58, flow proceeds to block 59. Additionally, if the current frame is the user frame, flow proceeds from block 50 (FIG. 4) to block 59.

In block 59, the controller 14 checks the output of the decoder 12 to determine whether there is the pager address in the address field of the paging signal. If there is no matching address number in a burst signal, flow proceeds from block 59 to block 60 to turn off the front end power. If the answer is affirmative in block 59, on the other hand, flow proceeds to block 67 where the controller 14 activates the annunciator 19 to alert the user and stores the corresponding message into RAM 15. Then, a test made in block 68 to determine whether the end-of-burst timing is reached. If so, flow proceeds from block 68 to block 60 to turn off the front end power. Following the execution of block 60, the variable "i" is checked to see if it is equal to "5" (block 61).

If the address search is not performed on five burst signals, flow proceeds from block 60 to block 61 to determine whether the counter 20 indicates that a time period T–X has elapsed from the restart timing of counter 20 in block 53. If the period T–X has elapsed, flow exits block 62 and returns to block 51 to repeat the process to make a further address search in another burst signal of the same user frame. This is done by reactivating the front end and restarting counter 20 (block 51), restarting it again after elapse of time X (blocks 52, 53), incrementing the variable T by one and looping blocks 55 and 70 for a synchronization test using the timing values X and Y of block 57. During this process, the X and Y values are updated to the values of block 57, so that the front end 10 is reactivated at timing advanced by period $x_2$ and synchronizer 11 is given a time-out period $y_2$ as shown in FIG. 2.

If the address search has been performed on all burst signals of the user frame, the decision in block 61 is affirmative and flow proceeds to block 63 to check to see if the counter 20 indicates the end of the user frame. If so, flow advances to block 64 to restart the counter 20 and proceeds to block 65 where the controller 14 resets the variable T to 3600 seconds and updates the timing variables X and Y accordingly. In block 66, controller 14 now resets the flag F and variable "i" to zero and proceeds to block 62 to check to see if the time period T–X has elapsed. If so, flow returns to block 51 to repeat the process for making a further address search in the next superframe. During this process, the X and Y values are updated to the values of block 65, so that the front end 10 is reactivated at timing advanced by period $x_3$ and synchronizer 11 is given a time-out period $y_3$ as shown in FIG. 2.

It will be appreciated from the foregoing that the time-out period Y is first see to $Y_1$ corresponding to Ti, then to $y_2$ corresponding to the 12-second turn-off interval during a user frame, and then to $y_3$ which corresponds to the 3600-second interval between successive superframes. When the receiver enters the second superframe, the time-out period is again changed to $y_2$ as illustrated in FIG. 2. If the initially synchronized burst signal is in the user frame when the pager is manually powered on, the X and Y timing variables are set equal to $x_2$ and $y_2$, respectively. As long as the pager is powered on, the timing variables X and Y are varied between $x_2$, $y_2$ and $x_3$, $y_3$.

If synchronization is not established within the time-out period Y of any of the values $y_1$, $y_2$ and $Y_3$, flow proceeds from block 70 to block 71 where the controller 14 Turns off the front end 10, and proceeds to block 72 to check for F=1. If flag F is 0, it is determined that the time-out period Y has still been set either to $y_1$ or $Y_3$, and flow proceeds to block 73 to reset the variable T to 12 seconds and update the X and Y timing variables accordingly, and proceeds to block 74 to set the flag F to 1. Exit then is to block 75 to check to see if variable "i" is equal to or greater than 2, or not. If variable "i" is 1, flow proceeds from block 75 to block 62 to check for the turn-on timing T–X in order for the front end 10 to be turned on again in block 51 at the instant advanced by $x_2$.

If variable "i" is equal to or greater than 2, flow proceeds from block 75 to block 76 where the controller 14 multiplies the integers A and B by variable "i", and updates the timing variables X and Y accordingly. Therefore, if sync acquisition has failed twice for successive burst signals, the integers A and B and hence the timing advance variable X and the time-out period Y are scaled up by a factor corresponding to the number of times the sync acquisition has repeatedly failed.

If F=1 is detected in block 72, it is determined that the time-out period Y has already been reset to $y_2$, and flow proceeds to block 75 by skipping blocks 73 and 74.

A further test in block 77 determines whether the variable "i" is equal to a predetermined number "k". If sync acquisition has failed "k" times in succession, it is determined that sync acquisition cannot be achieved even though it is repeated further. In this case, the decision in block 77 is affirmative and flow returns to the starting point of the program to restage the program execution over again. If variable "i" is smaller than "k", flow proceeds from block 77 to block 62.

What is claimed is:

1. A radio pager comprising:
   a receiver arranged to be activated for receiving a paging signal;
   a synchronizer for establishing synchronization to a bit sequence contained in each burst signal of said paging signal; and
   power saving control means for periodically activating said receiver at short intervals during reception of closely spaced burst signals with a short warm-up period for each closely spaced burst signal to allow said receiver to be warmed up within the short warm-up period and with a short time-out period subsequent to the short warm-up period to allow said synchronizer to synchronize within said short time-out period, and for activating said receiver at long intervals during reception of a burst signal remotely spaced from said closely spaced burst signals with a long warm-up period to allow said receiver to be warmed-up within said long warm-up period and with a long time-out period subsequent to the long warm-up period to allow said synchronizer to synchronize within said long time-out period.

2. The radio pager as claimed in claim 1, wherein said power saving control means comprises means for increasing said short warm-up period and said short time-out period when synchronization is not established repeatedly by said synchronizer.

3. The radio pager as claimed in claim 1, wherein said power saving control means further comprises means for counting the number of burst signals to which synchronization is not established by said synchronizer and multiplying said short warm-up period and said short time-out period by a factor corresponding to the counted number of said burst signals.

4. The radio pager as claimed in claim 1, wherein said power saving control means further comprises means for counting the number of burst signals to which synchronization is not established by said synchronizer and initializing said pager so that the pager restarts operation if the counted number of said burst signals exceeds a predetermined value.

5. A selective calling radio pager for receiving a paging signal of a superframe structure comprising a recurrent series of frames each containing a plurality of burst signals, each burst signal comprising a synchronization field, a frame number field and an address field, one of the frames in each superframe being assigned to the pager, said pager comprising:

a receiver arranged to be activated for receiving said paging signal;

a synchronizer connected to said receiver for establishing synchronization to a bit sequence received in said synchronization field; and control means for establishing a short warm-up period and a short time-out period before each of the burst signals of the assigned frame of a first superframe is received and a long warm-up period and a long time-out period before the burst signals of the assigned frame of a second superframe are received, determining whether said synchronization is established within each of said short and long time-out periods, activating said receiver at the start of said short warm-up period advanced from the start of each burst signal of the assigned frame of said first superframe, deactivating the receiver at the end of said short time-out period if said synchronization is determined to be not established or after the end of said short time-out period if said synchronization is determined to be established, and activating said receiver at the start of said long warm-up period advanced from the start of the assigned frame of said second superframe, and deactivating the receiver at the end of the long time-out period when said synchronization is determined to be not established or after the end of said long time-out period if said synchronization is determined to be established.

6. The selective calling radio pager as claimed in claim 5, wherein said control means includes means for establishing said long warm-up period and said long time-out period at the end of the assigned frame of said first superframe.

7. The selective calling radio pager as claimed in claim 5, further comprising a decoder connected to said synchronizer for comparing a user address received in the address field of the assigned frame with a pager address assigned to the pager, and detecting a match or a mismatch therebetween, wherein said control means includes means for continuously activating said receiver if said match is detected by the decoder and deactivating said receiver at the instant said mismatch is detected by the decoder.

8. The selective calling radio pager as claimed in claim 5, wherein said control means further comprises means for increasing said short warm-up period and said short time-out period when synchronization is not established repeatedly by said synchronizer.

9. The selective calling radio pager as claimed in claim 5, wherein said control means further comprises means for counting the number of burst signals for which synchronization is not established by said synchronizer and multiplying said short warm-up period and said short time-out period by a factor corresponding to the counted number of said burst signals.

10. The selective calling radio pager as claimed in claim 5, wherein said control means includes means for counting the number of burst signals to which synchronization is not established by said synchronizer and initializing said pager so that the pager restarts operation if said number exceeds a predetermined value.

11. A method for power-saving a selective calling radio pager, the pager comprising a receiver arranged to be activated for receiving a paging signal, and a synchronizer for synchronizing to a bit sequence contained in each burst signal of said paging signal, the method comprising:

a) periodically activating said receiver at short intervals for reception of closely spaced burst signals with a short warm-up period to allow said receiver to be warmed up within the short warm-up period and a short time-out period to allow said synchronizer to synchronize within the short time-out period;

b) deactivating the receiver;

c) activating said receiver for reception of a burst signal spaced remotely from said closely spaced burst signals with a long warm-up period to allow said receiver to be warmed up within the long warm-up period and a long time-out period to allow said synchronizer to synchronize within said long time-out period; and d) repeating the steps (a) to (c).

12. The method as claimed in claim 11, furrier comprising the steps of increasing said short warm-up period and said short time-out period when synchronization is not established repeatedly by said synchronizer.

13. The method as claimed in claim 11, further comprising counting the number of burst signals to which synchronization is not established by said synchronizer and multiplying said short warm-up period and said short time-out period by a factor corresponding to the counted number of said burst signals.

14. The method as claimed in claim 11, further comprising the step of counting the number of burst signals to which synchronization is not established by said synchronizer and initializing said page so that the pager restarts operation if said number exceeds a predetermined value.

15. The method for power-saving a selective calling radio pager which is adapted to receive a paging signal of a superframe structure comprising a recurrent series of frames each containing a plurality of burst signals, each burst signal comprising a synchronization field, and an address field, one of the frames in each superframe being assigned to the pager, the pager comprising a receiver for receiving said paging signal, a synchronizer connected to the receiver for establishing synchronization to a bit sequence received in said synchronization field, the method comprising the steps of:

a) establishing a short warm-up period and a short time-out period before the burst signals of the assigned frame of a first superframe is received;

b) activating the receiver at the start of the short warm-up period advanced from the start of a burst signal of the assigned frame of the first superframe and determining whether synchronization is established by the synchronizer within said short time-out period;

c) if synchronization is determined by step (b) to be not established, deactivating said receiver at the end of the short time-out period, and if synchronization is determined by step (b) to be established, deactivating said receiver after the end of said short time-out period;

d) repeating steps (b) and (c) for all the burst signals of the assigned frame;

e) establishing a long warm-up period and a long time-out period and deactivating said receiver;

f) activating said receiver at the start of said long warm-up period advanced from the start of the assigned frame of a second superframe, and determining whether synchronization is established by the synchronizer within said long time-out period;

g) if synchronization is determined by step (f) to be not established, deactivating said receiver at the end of the long time-out period, and if synchronization is determined by step (f) to be established, deactivating said receiver after the end of the long time-out period;

h) establishing said short warm-up period and said short time-out period; and i) repeating steps (a) to (h).

16. The method for power-saving a selective calling radio pager which is adapted to receive a paging signal of a superframe structure comprising a recurrent series of frames each containing a plurality of burst signals, each burst signal comprising a synchronization field, and an address field, one of the frames in each superframe being assigned to the pager, the pager comprising a receiver for receiving said paging signal, a synchronizer connected to the receiver for establishing synchronization to a bit sequence received in said synchronization field, the method comprising the steps of:

a) activating the receiver for detecting a frame and determining a time interval between the detected frame and the assigned frame;

b) determining an initial warm-up period and an initial time-out period in accordance with the time interval determined by step (a) and deactivating the receiver;

c) activating the receiver at the start of the initial warm-up period advanced from the start of the assigned frame and determining whether synchronization is established by the synchronizer within said initial time-out period;

d) if synchronization is determined by step (c) to be not established, deactivating said receiver at the end of the initial time-out period, and establishing a short warm-up period and a short time-out period;

e) if synchronization is determined by step (c) to be established, establishing said short warm-up period and said short time-out period and deactivating said receiver after the end of said initial time-out period;

f) activating the receiver at the start of the short warm-up period advanced from the start of a burst signal of the assigned frame of the first superfame and determining whether synchronization is established by the synchronizer within said short time-out period;

g) if synchronization is determined by step (f) to be not established, deactivating said receiver at the end of the short time-out period, and if synchronization is determined by step (f) to be established, deactivating said receiver after the end of said short time-out period;

h) repeating steps (f) and (g) for all the burst signals of the assigned frame;

i) establishing a long warm-up period and a long time-out period and deactivating said receiver;

j) activating said receiver at the start of said long warm-up period advanced from the start of the assigned frame of a second superframe, and determining whether synchronization is established by the synchronizer within said long time-out period;

k) if synchronization is determined by step (j) to be not established, deactivating said receiver at the end of the long time-out period, and if synchronization is determined by step (j) to be established, deactivating said receiver after the end of the long time-out period;

l) establishing said short warm-up period and said short time-out period; and m) repeating steps (g) to (l).

17. The method as claimed in claim 16, wherein said pager includes a decoder connected to said synchronizer for comparing a user address received in the assigned frame with a pager address assigned to the pager and detecting a match or mismatch therebetween, and wherein the step (e) deactivates said receiver at the end of a burst signal if said match is detected by the decoder or at the instant said mismatch is detected by the decoder, and the step (g) deactivates said receiver at the end of a burst signal if said match is detected by the decoder or at the instant said mismatch is detected by the decoder.

* * * * *